US011534788B2

(12) United States Patent
Luth

(10) Patent No.: US 11,534,788 B2
(45) Date of Patent: Dec. 27, 2022

(54) METHODS AND SYSTEMS FOR ATOMIZED COMPOSITIONS PROPELLED BY GAS

(71) Applicant: Jeremy A. Luth, Katy, TX (US)

(72) Inventor: Jeremy A. Luth, Katy, TX (US)

( * ) Notice: Subject to any disclaimer, the term of this patent is extended or adjusted under 35 U.S.C. 154(b) by 0 days.

(21) Appl. No.: 17/164,473

(22) Filed: Feb. 1, 2021

(65) Prior Publication Data

US 2022/0241811 A1 Aug. 4, 2022

(51) Int. Cl.

| | |
|---|---|
| ***B05B 13/06*** | (2006.01) |
| ***B05B 7/00*** | (2006.01) |
| ***B05B 7/24*** | (2006.01) |
| ***B05D 1/02*** | (2006.01) |
| ***B05D 7/22*** | (2006.01) |
| ***C09D 5/08*** | (2006.01) |
| ***C09D 7/65*** | (2018.01) |
| ***B05D 3/00*** | (2006.01) |
| ***B05D 1/00*** | (2006.01) |
| ***C09D 7/20*** | (2018.01) |

(52) U.S. Cl.

CPC ........ *B05B 13/0627* (2013.01); *B05B 7/0075* (2013.01); *B05B 7/2489* (2013.01); *B05B 7/2491* (2013.01); *B05D 1/02* (2013.01); *B05D 1/60* (2013.01); *B05D 3/007* (2013.01); *B05D 7/222* (2013.01); *B05D 7/225* (2013.01); *C09D 5/08* (2013.01); *C09D 7/20* (2018.01); *C09D 7/65* (2018.01)

(58) Field of Classification Search

None

See application file for complete search history.

(56) References Cited

U.S. PATENT DOCUMENTS

| | | | | | |
|---|---|---|---|---|---|
| 4,252,763 | A * | 2/1981 | Padgett | B05D 7/222 | 239/214 |
| 4,327,132 | A * | 4/1982 | Shinno | B05D 7/22 | 427/236 |
| 4,668,534 | A * | 5/1987 | Gray | B05D 7/22 | 427/195 |
| 5,089,297 | A * | 2/1992 | Koga | B05D 7/22 | 427/388.1 |
| 5,522,930 | A * | 6/1996 | Modera | B05D 7/22 | 427/236 |
| 6,019,845 | A * | 2/2000 | Nakakoshi | B05C 19/06 | 118/55 |
| 6,241,164 | B1 * | 6/2001 | Wolfe | B05B 7/2467 | 239/372 |

(Continued)

*Primary Examiner* — Binu Thomas

(74) *Attorney, Agent, or Firm* — Kearney, McWilliams & Davis; Erik J. Osterrieder

(57) ABSTRACT

This disclosure provides methods and systems that comprise a misting unit for atomizing a water-based or solvent-based composition, such as a liquid composition thereof to create a mist. Further, the disclosed methods and systems may include introducing, through an airtight aperture in a pipe or substrate, the mist into the pipe or the substrate. Further still, the disclosed methods and systems may include propelling, by an inert or non-inert gas, the mist onto at least a portion of the interior surface of a substrate connected to or integrated with the pipe within a closed system. The misting unit may be removably or irremovably connected to the pipe for optionally removably connecting to the substrate.

20 Claims, 3 Drawing Sheets

(56) References Cited

U.S. PATENT DOCUMENTS

| | | | | |
|---|---|---|---|---|
| 2003/0138558 | A1* | 7/2003 | Wang | B05D 7/222<br>427/236 |
| 2005/0279865 | A1* | 12/2005 | Thomason | B05B 7/2497<br>239/525 |
| 2008/0173728 | A1* | 7/2008 | Ilfrey | B29B 7/7419<br>239/74 |
| 2013/0140374 | A1* | 6/2013 | Adams | B05B 7/2472<br>239/8 |
| 2019/0201922 | A1* | 7/2019 | Haydell | B05B 7/2416 |

* cited by examiner

METHODS AND SYSTEMS FOR ATOMIZED COMPOSITIONS PROPELLED BY GAS

FIELD

This disclosure relates to methods and systems for atomizing compositions, e.g., spraying a misted liquid of the same or variable size, such as through one or more nozzles that are carried downstream by a gas, whether inert or otherwise, for optionally coating at least a portion of a substrate in communication therewith in a closed system.

BACKGROUND

Coating at least a portion of a substrate is desirous to improve or impart the substrate with various functionalities. The inventive and useful methods and systems in this disclosure are new or improvements in the art.

SUMMARY

In one example embodiment, this disclosure provides methods that may include atomizing a water-based or solvent-based composition, such as a liquid composition that may constitute a homogenous solution, emulsion, gel, or heterogenous mixture, wherein the liquid composition may include an inhibitor, biocide, coating, dispersant, fire retardant, oxygen scavenger, fragrance, cleaner, disinfectant, detergent, oil or combinations thereof to create a mist containing uniform or non-uniform droplets, i.e., particles of the mist. Further, the method may include introducing, through an airtight aperture in a pipe or a substrate, the mist into the pipe or the substrate. Further still, the method may include propelling, by an inert or non-inert gas, the mist onto at least a portion of the interior surface of a substrate directly or indirectly connected to the pipe or integrated with the system the pipe within a closed system.

In another example embodiment, this disclosure provides systems that may include an atomizer for atomizing a water-based or solvent-based composition, which may include an inhibitor, biocide, coating, dispersant, fire retardant, oxygen scavenger, fragrance, cleaner, disinfectant, detergent, oil or combinations thereof to create a mist containing uniform or non-uniform droplets that are microscopic and/or macroscopic. Further, the system may include a pipe or a substrate having an airtight aperture for communication with the atomizer, wherein the aperture is at a location for introducing the mist into the pipe or the substrate. Further still, the system may include an inert or non-inert gas supply located upstream from the atomizer for propelling the mist onto at least a portion of the interior surface of a substrate integrated therewith or connected to the pipe, which is removably or irremovably connected to the substrate, wherein the system is a closed system.

BRIEF DESCRIPTION OF THE DRAWINGS

So that the manner in which the above recited features, advantages and objects of the present disclosure are attained and can be understood in detail, a more particular description of this disclosure, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for this disclosure may admit to other equally effective embodiments.

DETAILED DESCRIPTION

Figure 1:
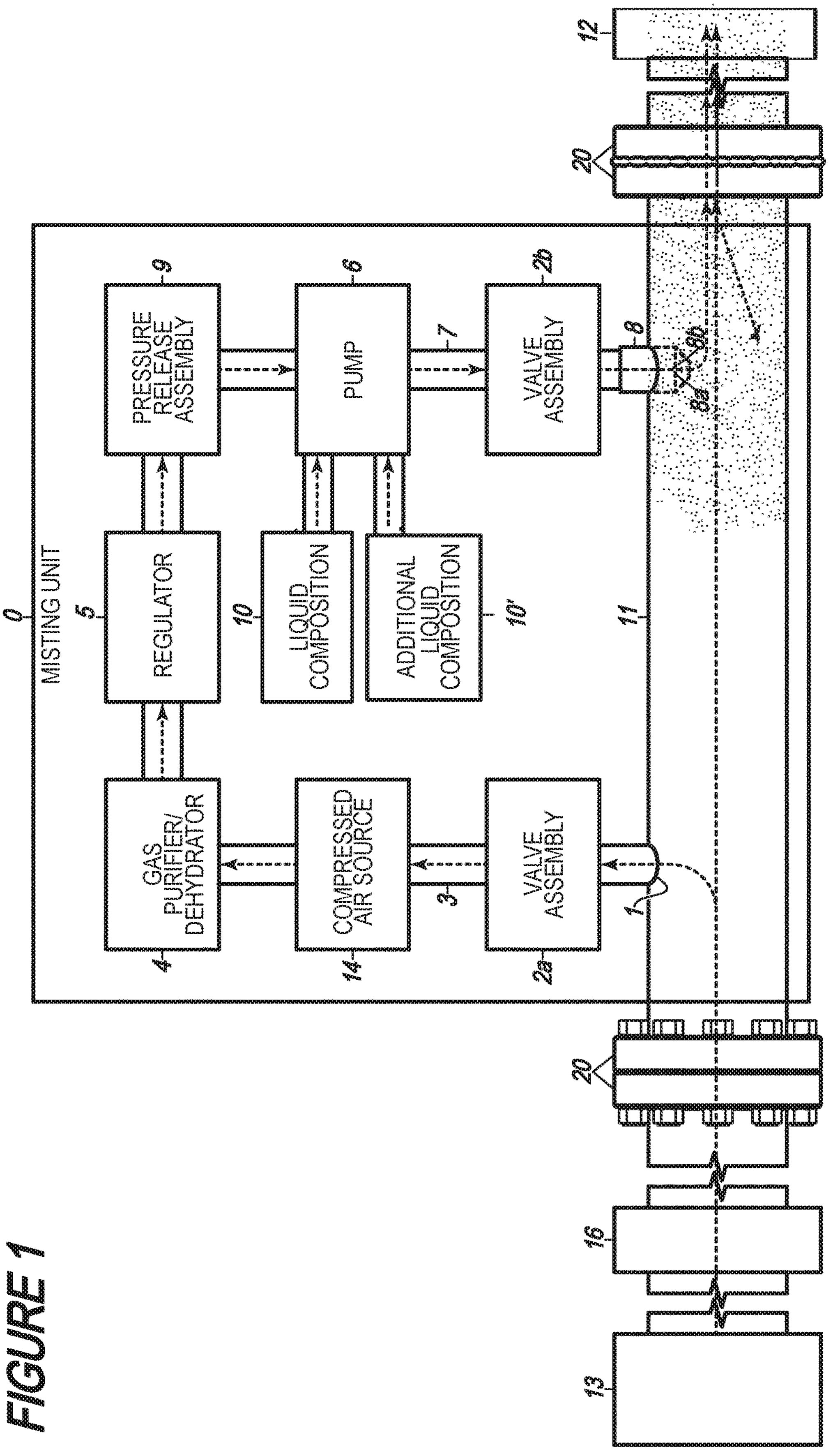
FIG. 1 shows a schematic diagram for use in discussing methods and systems in optionally removable connection, i.e., connected to, a substrate in accordance with this disclosure.

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are now be described, including exemplary embodiments and definitions that are adopted herein for purposes of understanding. While the following detailed description gives specific embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

Specific structural and functional details disclosed herein are not to be interpreted as limiting, but merely as a basis of the claims and as a representative basis for teaching persons having ordinary skill in the art to variously employ the present invention. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Throughout this specification, unless the context requires otherwise, the word "comprise" or variations such as "comprises" or "comprising", will be understood to imply the inclusion of a stated integer or group of integers but not the exclusion of any other integer or group of integers. And other than the claims, the word "comprise" or variations such as "comprises" or "comprising" will be understood to encompass not only the open configuration that the law says "comprise" means, but also understood to include alternative embodiments of "consisting essentially of" and "consisting of" as these two terms are understood in the law to mean.

It is to be appreciated that reference to "one example" or "an example" of the disclosed subject matter is not made in an exclusive sense. Accordingly, one example may exemplify certain aspects of the invention, whilst other aspects are exemplified in a different example. These examples are intended to assist the skilled person in performing what is disclosed and claimed; they are not intended to limit the overall scope of the invention in any way unless the context clearly indicates otherwise.

Figure 2:
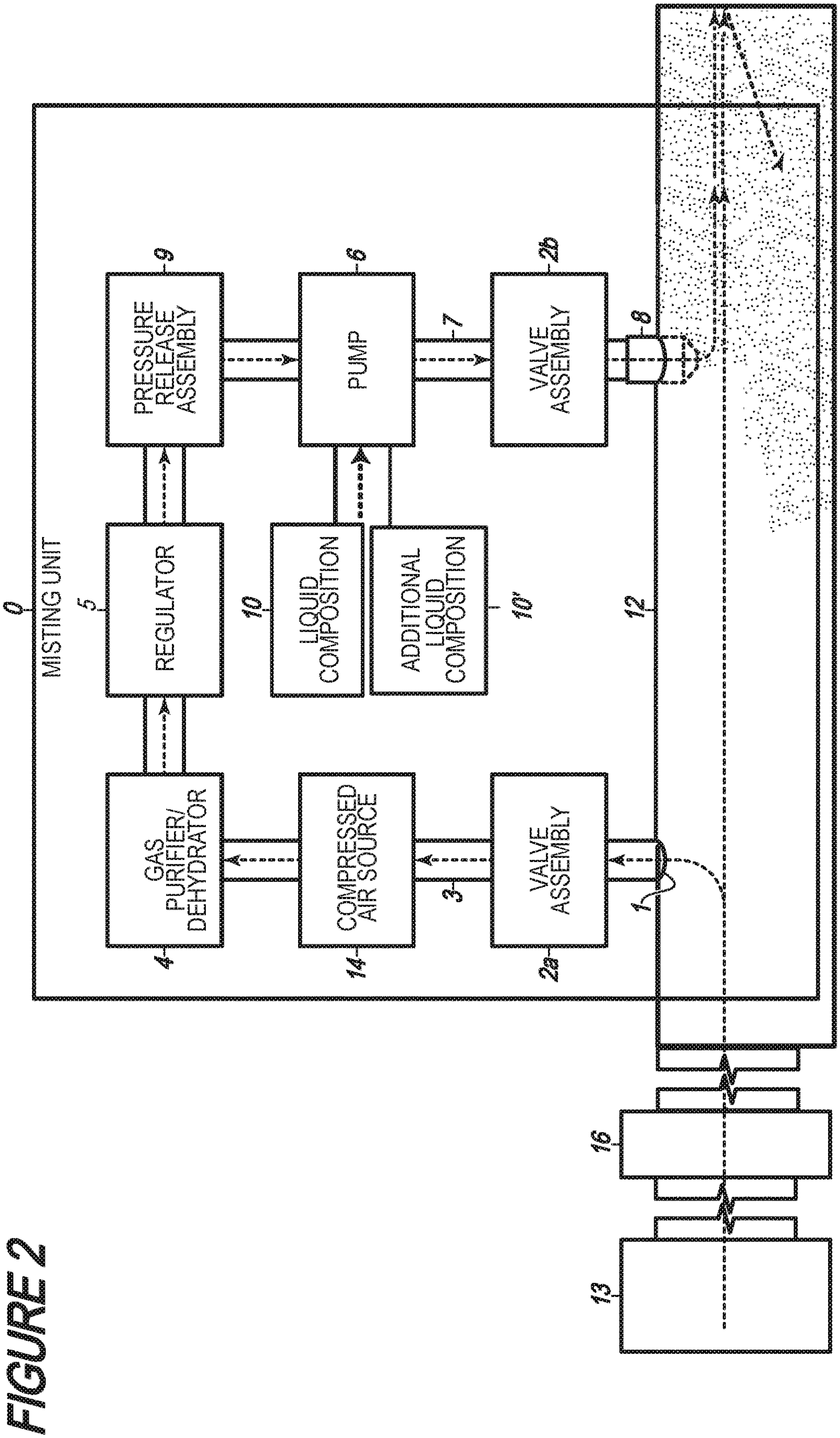
FIG. 2 shows a schematic diagram for use in discussing methods and systems in optionally irremovable connection, i.e., integrated with, a substrate, such as an HVAC system, in accordance with this disclosure.
Figure 3:
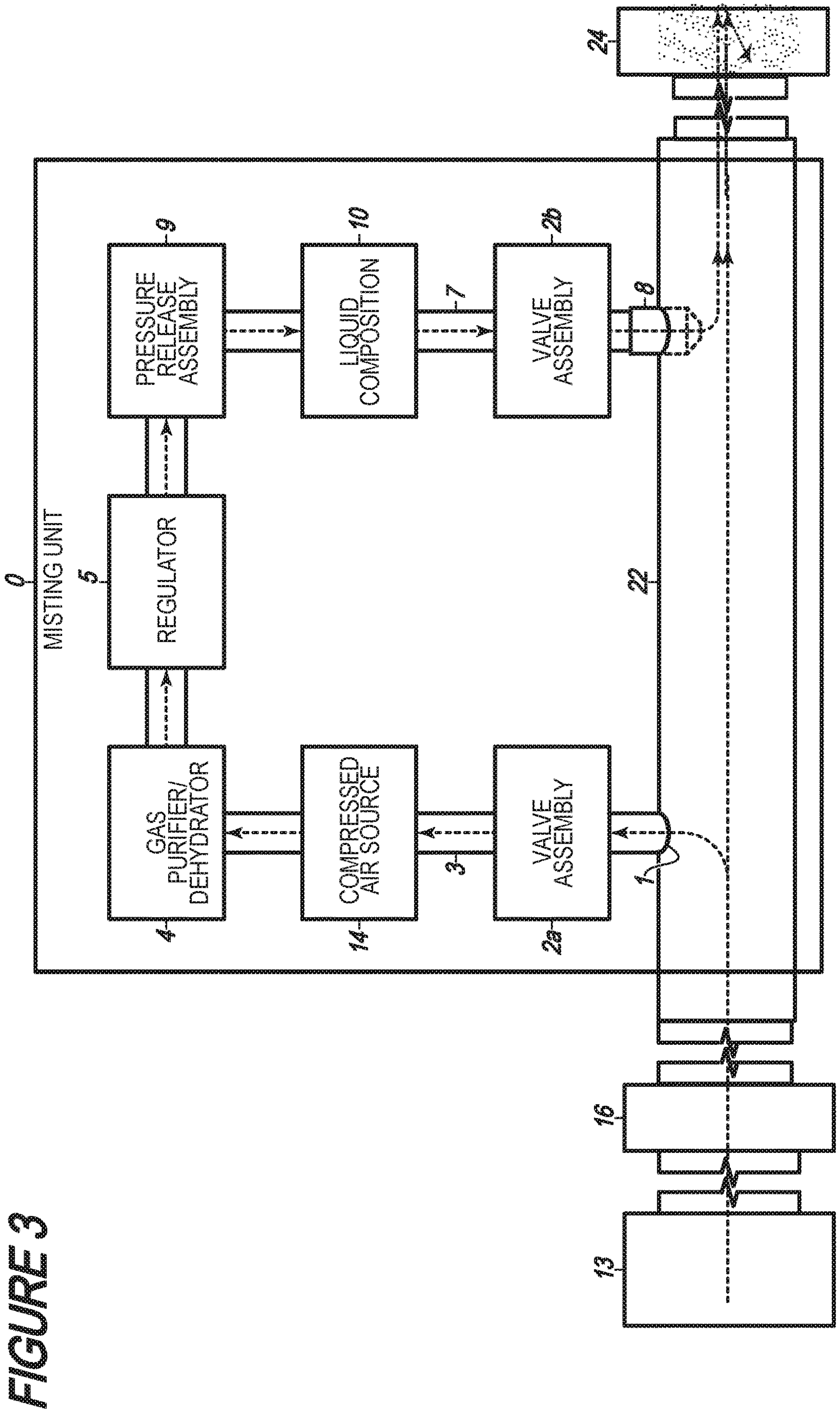
FIG. 3 shows a schematic diagram for use in discussing methods and systems in optionally removable connection with a substrate, such as a tub, bath, container, or other apparatus, such a submersible apparatus, in accordance with this disclosure.

Generally disclosed are methods and systems for atomizing compositions, e.g., spraying a misted composition having mist particles of the same or variable size, such as through one or more nozzles that are carried downstream by a gas, whether inert or otherwise, for optionally coating at least a portion of a substrate, such as coiled tubing or a heating, ventilation, and/or air conditioning ("HVAC" as used herein) unit in airtight communication therewith in a closed system comprising a misting unit optionally removably connected to, such as a pup joint or duct work, either a pipe or substrate, or integrated with a substrate, such as an HVAC unit, wherein the connection is in at least substantially airtight communication with either a substrate or a pipe and a gas supply at or proximate to opposing ends of the pipe or the substrate. Turning now to FIG. 1, a schematic diagram helps to elucidate on details of example embodiments of the disclosed methods and systems. FIG. 1 depicts a misting unit 0, which is optionally removably connected to a pipe 11, in connection with a substrate 12, or integrated with a substrate 12 such as shown in FIG. 2 for an airtight connection. More generally, the misting unit 0 is in removable is irremovable communication with the pipe 11, the substrate 12 and/or both, wherein the connection 20 may be by flanges, hammer unions, fasteners, bolts, nuts, glue, clamps, or otherwise. At or proximate to one end of the pipe 11 or the substrate 12 is a gas supply 13, which may be an inert or non-inert gas under pressure, and optionally in communication with a blower fan 16 placed before or after the gas supply 13, that propels the inert or non-inert gas downstream from the gas supply 13 in at least one direction, i.e., down the pipe 11 or the substrate 12 and/or into the misting unit 0. The blower fan 16 may be an optional component in various embodiments, even though it is depicted in FIGS. 1-3. For instance, in various embodiments of the disclosed methods and systems, a hereby explicitly disclosed, example embodiment is shown by FIG. 3, except that there is no blower fan 16, compressed air source 14, and, optionally, no pressure release assembly 9 for this example embodiment. Turning now to the examples of gases that may be used, the gases may be Group 18 gases, oxygen, air, nitrogen and/or others. The chosen gas, for example, may depend, at least in part, on whether the gas should or should not react with the liquid composition(s) 10 within the misting unit 0 to be atomized.

The gas entering the pipe 11 or the substrate 12 and/or the misting unit 0 may be regulated. In one example, the gas supply 13, itself, may have an airtight connection point 1 for receiving the gas into the misting unit 0, which may be viewed as including or not including the pipe 11; this viewpoint may depend on whether the pipe 11 or substrate 12 is irremovably connected (i.e., integrated with), such as by welding, to the rest of the misting unit 10 or is removably connected to the pipe 11 or substrate, such as through hammer unions, glue, duct tape, or otherwise. Within the misting unit 0, the gas may be regulated in one or more locations. In one instance, such as that shown in FIG. 1, there may be a regulator 5—or more regulators as desired for the intended use. In the depicted embodiments of FIGS. 1 and 2, a regulator 5 of the supplied gas is located between the pipe 11 or substrate 12 and a pump 6, which may be in communication through a hose 3 with a contained liquid composition 10 that comprises a water-based (i.e., aqueous) or solvent-based (i.e., non-aqueous) liquid mixture, e.g., a homogenous solution, emulsion, gel, or heterogenous mixture, that may further include an inhibitor, biocide, coating, dispersant, fire retardant, oxygen scavenger, fragrance, cleaner, disinfectant, detergent, oil or combinations thereof. Additionally and alternatively, the liquid composition may include a corrosion inhibitor, elastomeric coating, paraffin dispersants, one or more polar compositions, one or more non-polar compositions, or combinations thereof. The pump 6, itself, may be optional in some embodiments, such as for methods and systems exemplified by FIG. 2, such as even when the substrate 12 is an HVAC system or other substrates 12 in other embodiments, and may be optional in some embodiments using FIG. 3, such as when the substrate 24 is a tub, bath or otherwise; note, however, that the opposite is true too: pump 6 may be included in example embodiments when the substrate 12 is an HVAC system or the liquid composition 12 contains fire-retardant materials and/or when the substrate 24 is a tub, bath or otherwise. Nonetheless, may be a pneumatically actuated pump, such as a piston or peristaltic pump. A specific and non-limiting example of a pump 6 for use in the disclosed methods and systems is a Graco Python XL-DA piston pump.

In another example, such as when air is the supplied gas to or within the misting unit 0, it 0 may contain a compressed air source 14 proximate to the pump 6 or substrate 12 to augment the pressure for pumping 6 the contained composition 10, such as through a hose 7 (as well as additional compositions and hoses as described in the following paragraph), for ultimate delivery to the atomizer 8 as shown in FIGS. 1 and 2. Being optional, some embodiments may include a compressed air source 14 and some embodiments may not. Such a configuration may be advantageous when the misting unit 0 is connected, such as through duct tape or otherwise, to form at least substantially air-tight seals, to a substrate 12 such as an HVAC unit as shown by reference to FIG. 2.

As for the liquid composition 10, it 10 may be located in a container, such as that shown in FIG. 1 and in communication via a hose with a pump 6 that pulls the composition 10 for optionally regulated **5*b* advancement through a hose 7 for communication of the pumped 6 composition 10 to the atomizer 8. In other example embodiments, there may be additional container(s) containing the same or different composition(s), such as additional container composition 10' in FIG. 1—such as the compositions disclosed at paragraph —wherein each additional container may have its own hose that ties into the same pump 6, such as additional container composition 10' does in FIG. 1**, or other pumps that collectively and/or cooperatively advance all of the pumped 6 liquid composition(s) 10, etc. into hose 7 and/or other hoses tied into the misting unit 0 for ultimate delivery of the composition(s) to the atomizer 8. That is, the disclosed method and systems provide for united delivery of pumped liquid composition(s) 10. etc. fed to the atomizer 8 from container(s). In yet additional and alternative embodiments, the liquid composition 10 may contain and/or be in communication, such as delivered by the gas supply 13 or otherwise through hose(s) or as otherwise discussed herein or known in the art, one or more catalysts that sire located in one or more containers, wherein the catalyst(s) are in the liquid or gas phase for mixture with the liquid composition 10.

Also within the misting unit 0 as shown in FIGS. 1 and 2, the disclosed methods and systems may include one or more valve assemblies, 2*a*, 2*b*, such as ball-valve assemblies that may sustain high pressures, that allow for unidirectional or bidirectional gas flow. Additionally in some example embodiments, the misting unit 0 may optionally include a pressure-release assembly 9, such as a ball valve, to release pressure. And in yet additional example embodiments, the misting unit 0 may optionally include a gas purifier/dehydrator 4 for dehumidifying the supplied gas. It is noteworthy that the equipment in the schematic diagram shown in FIGS. 1 and 2 is illustrative, and, in various, alternative embodiments, all or some of the disclosed equipment may be included, multiplied, and/or arranged in different orders so as to still result in disclosed methods and systems that pump contained liquid composition(s), as previously discussed, with a gas carrier, to an atomizer 8 for atomization of the liquid composition(s) into a mist in a one-step process.

The misting unit 0 culminates with an atomizer 8, which is at least substantially airtight and optionally removably connected or integrated with the pipe 11 through an aperture 8 therein 11, wherein the pipe 11 may be a pipe or HVAC duct work, to deliver the atomized composition 15, i.e., mist, therein 11 that is carried by the gas 13 for coating at least a portion of a substrate 12, which, by non-limiting example, may be a pipe, coiled tubing, tube, duct, fire-suppression equipment, or the at least a portion of or another portion of an HVAC unit in communication with the at least a portion. The atomizing, itself, in the atomizer 8 may be performed by its 8 one or more removable or irremovable nozzles 8*a*, 8*b*, whether indirectly or directly connected inside or affixed to the exterior of the atomizer 8 or via pipe(s) or other connector(s) that indirectly or directly connect the one or more nozzles 8*a*, 8*b* to the inside or affixed on the exterior of the atomizer 8, that particularize the pumped, liquid composition into uniform or non-uniform sizes that are microscopic and/or macroscopic as desired by for the intended use, properties of the atomized, liquid composition, selected nozzles, and otherwise that constitute the mist 15.

In addition to the foregoing, optional steps may include flooding the pipe 11 with water or other liquid and/or blowing gas before or at least subsequent to atomizing the liquid composition(s). For example, one or both of these steps, optionally iteratively, may be performed at the end of the substrate coating process.

Moving on to FIG. 3, disclosed are methods and systems where at least the pump 6 shown in FIGS. 1 and 2 is not present. Although the foregoing disclosure discusses the presence of a pump 6, such as in FIGS. 1 and 2, it is understood hereby that the above-discussed example embodiments exclude a pump 6 in other example embodiments. That is, atomizing a liquid composition, introducing the mist into a pipe 11 or substrate 12, 24 and propelling the mist onto or into the pipe 11 or substrate 12, 24 in removable or irremovable communication with the mist from the misting unit 0 may exclude a pump 6 and/or even exclude a pressure release assembly 9.

Now, returning to FIG. 3, disclosed are methods and systems for atomizing a mist within a misting unit 0 as previously discussed but without at least a pump, wherein the liquid composition 10 to be misted contains one or more aromatherapeutics, therapeutics, pharmaceuticals, detergents, biocides, hospital-grade or industry-grade chemicals, bleach, and/or other chemicals, such as the ones discussed elsewhere in this disclosure. The atomized mist generated by the misting unit 0 makes an airtight connection 8 with a pipe 22 (tube, duct or similar apparatus) proximate to one end thereto 22 and thereof 22 and connects proximate to the other end of such pipe 22, which receives the optionally blown 16 gas source 13, which connects to the valve assembly 8. As a result, the air flow travels up through the misting unit 0 from the valve assembly 2*a* and through such pipe 22, which in any example embodiment of this disclosure may inherently have or have one or more additives applied thereto 11, 22 to make it 11, 22 adhesive/non-adhesive, non-corrosive, slippery, rough and/or otherwise so as to make at least a portion of the interior surface of it 12, 22 have a desired physical and/or chemical surface; the same or different additives may be inherent to or applied to the substrate 12, 24. To illustrate the inherently or additive-induced inertness of the interior of a pipe, FIG. 3 shows its pipe 22 and its connectors as having no or substantially no misted, liquid composition, but, instead, the misted, liquid composition does adhere to the substrate 24, wherein such adhesion may be an inherent property of the substrate 24 or induced through coatings applied to the surface of the substrate 24, additives within the misted, liquid composition, and/or otherwise. Furthermore, as shown in FIGS. 1-3, the airflow may bounce off a terminus or elsewhere of the pipe 11, 22 and/or substrate 12, 24, wherein these depictions are aimed at illustrating that the misted, liquid composition may eventually interact with, e.g., so as to coat, all or a portion of the interior surface of the pipe 11, 22 and/or substrate 12, 24. The pipe's 11, 22 (e.g., FIGS. 1 and 3) and/or substrate's 12, 24 (e.g., FIGS. 1-3) material may be plastic, such as a polyvinyl chloride pipe, metal, wood, otherwise, and combinations thereof. Referring again to FIG. 3, the atomized mist within the pipe 22 may irremovably or removably connect to a substrate 24, such as the substrate 12 described in relation to FIG. 1 or 2, or the substrate 24 shown in FIG. 3. The substrate 24 may also be a tub, bath, container, or other apparatus, such as a submersible container. In various embodiments, the misting unit 0 may be mountable, e.g., glue, hook(s), welded, etc. onto a wall or other surface and/or may be self-sustaining, such as by having legs, casters, rollers, wheels, such as where the misting unit 0 is removably or irremovably connected to a skid or table.

Although written in claim format, the following are additional, example embodiments of the disclosed methods and systems:

1. A method comprising:

atomizing a liquid composition comprising an inhibitor, biocide, coating, dispersant, fire retardant, oxygen scavenger, fragrance, cleaner, disinfectant, detergent, oil, aromatherapeutic, therapeutic, pharmaceutical, hospital-grade chemical, industry-grade chemical, bleach or combinations thereof to create a mist;

introducing, through an airtight aperture in a pipe or a substrate, the mist into the pipe or the substrate; and propelling, by a gas, the mist onto at least a portion of an interior surface of the substrate is in communication with the pipe and/or the substrate, such as by being: (1) directly or indirectly connected to the pipe and/or the substrate; or (2) integrated with the pipe and/or the substrate.

2. The method of claim 1, further comprising regulating at least one flow direction of the gas.

3. The method of claim 2, wherein the regulating comprises regulating a flow of the gas in at least one location between either the pipe or the substrate and a pump.

4. The method of claim 1, further comprising pumping, prior to the atomizing, the liquid composition from a container into a hose in communication with the airtight aperture.

5. The method of claim 1, further comprising pumping, prior to the atomizing, at least one more solution in another container into a hose in communication with the airtight aperture, whereupon the liquid composition and the at least one more liquid composition combine before creating the mist by the atomizing.

6. The method of claim 1, further comprising connecting a gas supply at least proximate to a first end of the pipe or the substrate.

7. The method of claim 1, further comprising filtering and/or dehydrating the gas prior to the atomizing.

8. The method of claim 1, further comprising regulating a flow of the liquid composition, and optionally one or more additional liquid composition combined with the liquid composition, for the atomizing.

9. The method of claim 1, wherein the atomizing comprises creating the mist by the gas powering a pump, which pushes the liquid composition through at least one hose, and optionally one or more additional liquid compositions combined with the liquid composition, through one or more nozzles.

10. The method of claim 1, further comprising flooding, subsequent to propelling, the pipe or the substrate with water.

11. The method of claim 1, further comprising blowing, subsequent to flooding, a gas through the pipe or the substrate.

12. A system comprising:

an atomizer for atomizing a liquid composition comprising an inhibitor, biocide, coating, dispersant, fire retardant, oxygen scavenger, fragrance, cleaner, disinfectant, detergent, oil, aromatherapeutic, therapeutic, pharmaceutical, hospital-grade chemical, industry-grade chemical, bleach or combinations thereof to create a mist;

a pipe or a substrate having an airtight aperture for communication with the atomizer, wherein the aperture is at a location for introducing the mist into the pipe or the substrate; and a gas supply located upstream from the atomizer for propelling the mist onto at least a portion of an interior surface of the substrate is in communication with the pipe or the substrate, such as by being: (1) directly or indirectly connected to the pipe and/or the substrate; or (2) integrated with the pipe in removable or irremovable connection with the substrate.

13. The system of claim 12, further comprising at least one valve between the gas supply and the atomizer.

14. The system of claim 12, wherein the atomizer comprises one or more nozzles.

15. The system of claim 12, wherein the atomizer is removably attachable to the airtight aperture.

16. The system of claim 12, further comprising at least one pump in communication with a hose for carrying the liquid composition, and, optionally, for carrying and/or combining with one or more additional liquid compositions.

17. The system of claim 16, wherein the one or more additional liquid compositions comprise an inhibitor, biocide, coating, dispersant, fire retardant, oxygen scavenger, fragrance, cleaner, disinfectant, detergent, or combinations thereof that is a same or different type than in the liquid composition and/or other(s) of the one or more additional liquid compositions.

18. The system of claim 12, wherein the substrate comprises coiled tubing, tube, duct, fire-suppression system, container, bath, tub, submersible container, or an HVAC unit.

19. The system of claim 12, wherein the liquid composition comprises one or more corrosion inhibitors, elastomeric coatings, paraffin dispersants, polar compositions, non-polar compositions or combinations thereof.

20. The system of claim 12, wherein the pipe is removably connected to the substrate.

While the foregoing is directed to example embodiments of the disclosed invention, other and further embodiments may be devised without departing from the basic scope thereof, wherein the scope of the disclosed systems and methods are determined by one or more claims.

What is claimed is:

1. A method comprising:

pumping through at least one pump in communication with a hose(s) for carrying a liquid composition and for carrying and/or combining with one or more additional liquid compositions;

atomizing the liquid composition comprising an inhibitor, biocide, coating, dispersant, fire retardant, oxygen scavenger, fragrance, cleaner, disinfectant, detergent, oil, aromatherapeutic, therapeutic, pharmaceutical, hospital-grade chemical, industry-grade chemical, bleach or combinations thereof to create a mist;

introducing, through an airtight aperture in a pipe or a substrate, the mist into the pipe or the substrate; and propelling, by a gas, the mist onto at least a portion of an interior surface of a substrate connected to the pipe or integrated with the substate, wherein the gas is from a gas supply located upstream from an atomizer for propelling the mist onto at least a portion of an interior surface of the substrate, which is integrated with a system having or connected to the pipe.

2. A system comprising:

an atomizer for atomizing a liquid composition comprising an inhibitor, biocide, coating, dispersant, fire retardant, oxygen scavenger, fragrance, cleaner, disinfectant, detergent, oil, aromatherapeutic, therapeutic, pharmaceutical, hospital-grade chemical, industry-grade chemical, bleach or combinations thereof to create a mist;

a pipe or a substrate having an airtight aperture for communication with the atomizer, wherein the aperture is at a location for introducing the mist into the pipe or the substrate;

at least one pump in communication with a hose(s) for carrying the liquid composition, and for carrying and/or combining with one or more additional liquid compositions; and a gas supply located upstream from the atomizer for propelling the mist onto at least a portion of an interior surface of the substrate, which is integrated with the system or connected to the pipe.

3. The system of claim 2, further comprising at least one valve between the gas supply and the atomizer.

4. The system of claim 2, wherein the atomizer comprises a nozzle.

5. The system of claim 2, wherein the atomizer is removably attachable directly to the airtight aperture.

6. The system of claim 2, wherein the one or more additional liquid compositions comprise an inhibitor, biocide, coating, dispersant, fire retardant, oxygen scavenger, fragrance, cleaner, disinfectant, detergent, or combinations thereof that is a same or different type than in the liquid composition and/or other(s) of the one or more additional liquid compositions.

7. The system of claim 2, wherein the substrate comprises coiled tubing, tube, duct, fire-suppression system, container, bath, tub, submersible container, or an HVAC unit.

8. The system of claim 2, wherein the liquid composition comprises one or more corrosion inhibitors, elastomeric coatings, paraffin dispersants, polar compositions, non-polar compositions or combinations thereof.

9. The system of claim 2, wherein the pipe is removably connected to the substrate.

10. The system of claim 2, further comprising a blower fan.

11. The system of claim 2, further comprising a compressed air source upstream from a pump, wherein the compressed air source and the pump are located between the gas supply and the atomizer.

12. The system of claim 2, further comprising a gas purifier/dehydrator located between the gas supply and the atomizer.

13. The system of claim 2, wherein the system excludes a pressure release assembly.

14. The system of claim 2, further comprising a valve assembly in connection with atomizer.

15. The system of claim 2, wherein communication between the gas supply and the pipe and/or substrate connected to the pipe is through one or more hoses.

16. The system of claim 2, further comprising the liquid composition is located between the gas supply and a valve assembly, wherein the valve assembly is located upstream from and is in communication with the atomizer.

17. The system of claim 16, further comprising a second valve assembly, compressed air source, gas purifier/dehydrator, and regulator located upstream from the liquid composition.

18. The system of claim 2, wherein the atomizer comprises more than one nozzle.

19. A system comprising:

an atomizer for atomizing a liquid composition comprising an inhibitor, biocide, coating, dispersant, fire retardant, oxygen scavenger, fragrance, cleaner, disinfectant, detergent, oil, aromatherapeutic, therapeutic, pharmaceutical, hospital-grade chemical, industry-grade chemical, bleach or combinations thereof to create a mist;

a pipe or a substrate having an airtight aperture for communication with the atomizer, wherein the aperture is at a location for introducing the mist into the pipe or the substrate, wherein the liquid composition is located between the gas supply and a valve assembly, and wherein the valve assembly is located upstream from and is in communication with the atomizer; and a gas supply located upstream from the atomizer for propelling the mist onto at least a portion of an interior surface of the substrate, which is integrated with the system or connected to the pipe; and a second valve assembly, compressed air source, gas purifier/dehydrator, and regulator located upstream from the liquid composition.

20. A method comprising:

atomizing a liquid composition comprising an inhibitor, biocide, coating, dispersant, fire retardant, oxygen scavenger, fragrance, cleaner, disinfectant, detergent, oil, aromatherapeutic, therapeutic, pharmaceutical, hospital-grade chemical, industry-grade chemical, bleach or combinations thereof to create a mist;

introducing, through an airtight aperture in a pipe or a substrate, the mist into the pipe or the substrate, wherein:

(i) the aperture is at a location for introducing the mist into the pipe or the substrate, (ii) the liquid composition is located between the gas supply and a valve assembly, (iii) the valve assembly is located upstream from and is in communication with an atomizer, (iv) a second valve assembly, compressed air source, gas purifier/dehydrator, and regulator located upstream from the liquid composition, and propelling, by a gas, the mist onto at least a portion of an interior surface of a substrate connected to the pipe or integrated with the substate.

* * * * *